(12) United States Patent
Wang et al.

(10) Patent No.: US 12,219,461 B2
(45) Date of Patent: Feb. 4, 2025

(54) SERVICE REQUEST PROCESSING METHOD AND DEVICE AND ELECTRONIC DEVICE

(71) Applicant: Lenovo (Beijing) Limited, Beijing (CN)

(72) Inventors: Jianfeng Wang, Beijing (CN); Haipeng Lei, Beijing (CN); Jing Han, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 366 days.

(21) Appl. No.: 17/684,383

(22) Filed: Mar. 1, 2022

(65) Prior Publication Data
US 2022/0377648 A1 Nov. 24, 2022

(30) Foreign Application Priority Data
May 21, 2021 (CN) .......................... 202110557584.2

(51) Int. Cl.
*H04W 48/02* (2009.01)
*H04W 68/00* (2009.01)
*H04W 74/08* (2024.01)

(52) U.S. Cl.
CPC ........... *H04W 48/02* (2013.01); *H04W 68/00* (2013.01); *H04W 74/0891* (2013.01)

(58) Field of Classification Search
CPC . H04W 48/02; H04W 68/00; H04W 74/0891; H04L 67/60
See application file for complete search history.

(56) References Cited

U.S. PATENT DOCUMENTS

| | | | |
|---|---|---|---|
| 2011/0250869 A1* | 10/2011 | Mahajan | H04W 76/10 455/412.1 |
| 2020/0007415 A1* | 1/2020 | Circosta | H04L 41/5012 |
| 2021/0014152 A1* | 1/2021 | Li | H04L 12/185 |

\* cited by examiner

*Primary Examiner* — Robert C Scheibel
(74) *Attorney, Agent, or Firm* — ANOVA LAW GROUP, PLLC

(57) ABSTRACT

A service request processing method. The service request processing method includes obtaining service response state information mapped by a first service node on a physical layer; detecting whether the service response state information satisfied an access condition; prohibiting outputting a physical layer access request for the first service node if the access condition is not satisfied; and outputting the physical layer access request for the first service node to request to establish a physical transmission link with the first service node to receive requested service information fed back by the first service node through the physical transmission link if the access condition is satisfied.

19 Claims, 9 Drawing Sheets

SERVICE REQUEST PROCESSING METHOD AND DEVICE AND ELECTRONIC DEVICE

CROSS-REFERENCES TO RELATED APPLICATION

This application claims priority to Chinese Patent Application No. 202110557584.2, filed on May 21, 2021, the entire content of which is incorporated herein by reference.

FIELD OF TECHNOLOGY

The present disclosure relates to the field of communication technology and, more specifically, to a service request processing method and device, and an electronic device.

BACKGROUND

With the large-scale deployment of 5G networks, applications and services such as smart manufacturing, smart home, virtual reality (VR)/augmented reality (AR)/extended reality (XR) and Industrial Intern 4.0, wireless communication technologies are generally required to have high speed, low latency, high reliability, and support for multi-service concurrency.

As shown in FIG. 1 and FIG. 2, in the conventional service request processing workflow, whether in a scenario where the service receiving node (e.g., a wireless user device) requests the service, or in a scenario where the management node of the wireless network (e.g., an access device such as a base station) requests the service, the wireless user device as the service receiving node or the service providing node needs to initiate the network access request. After the communication channel with the management node is established, a service request is sent to the request data resources of the required service type.

However, if the service providing node does not have the requested service type, the established communication channel will be invalid. If the service providing node has the requested service type, but is currently in a busy service state and cannot respond to the service request immediately, the service providing node needs to continuously occupy the wireless communication resources to maintain the established communication channel, which not only waste the wireless communication resources, but also increase the energy consumption of the wireless user device.

BRIEF SUMMARY OF THE DISCLOSURE

One aspect of the present disclosure provides a service request processing method. The service request processing method includes obtaining service response state information of a first service node mapped on a physical layer: detecting whether the service response state information satisfied an access condition: prohibiting outputting a physical cal layer access request for the first service node if the access condition is not satisfied; and outputting the physical layer access request for the first service node to request to establish a physical transmission link with the first service node to receive requested service information fed back by the first service node through the physical transmission link if the access condition is satisfied.

Another aspect of the present disclosure provides a service request processing device. The service request processing device includes a service response state information acquisition module configured to obtain the service response state information of a first service node mapped on a physical layer: a detection module configured to detect whether the service response state information satisfies an access condition: an access prohibition module configured to prohibit outputting of a physical layer access request for the first service node when a detection result of the detection module is negative; and an access module configured to output the physical layer access request for the first service node to request to establish a physical transmission link with the first service node, and receive requested service information fed back by the first service node through the physical transmission link when the detection result of the detection module is positive.

Another aspect of the present disclosure provides an electronic device. The electronic device includes a communication interface: a processor; and a memory storing program instructions that, when being executed by the processor, cause the processor to obtain service response state information of a first service node mapped on a physical layer: detect whether the service response state information satisfied an access condition: prohibit outputting a physical layer access request for the first service node if the access condition is not satisfied; and output the physical layer access request for the first service node to request to establish a physical transmission link with the first service node to receive requested service information fed back by the first service node through the physical transmission link if the access condition is satisfied.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Figure 1:
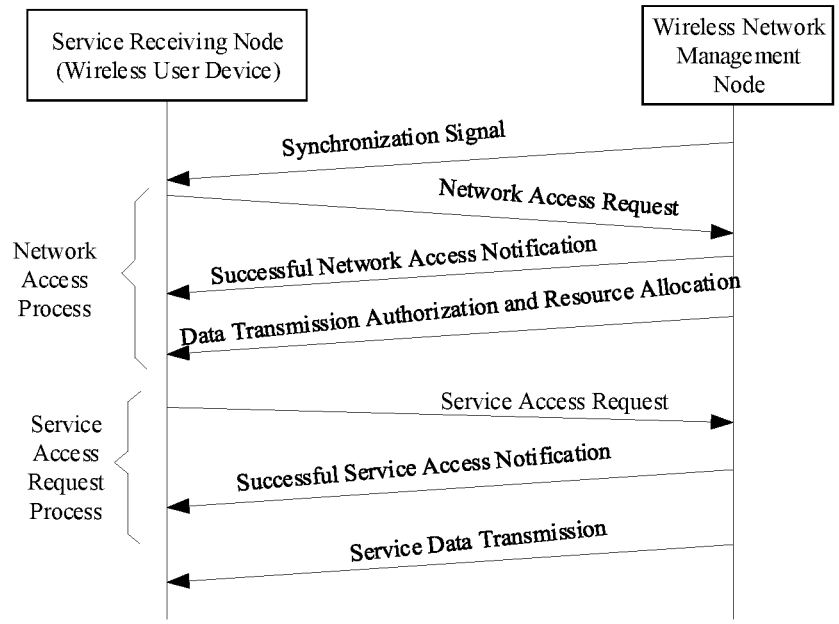
FIG. 1 is a flowchart of a service request processing method in conventional technology.

In order to address the waste of the wireless communication resources and the increase of the energy consumption of the wireless user device, in the present disclosure, when the service providing node does not have the requested service type, or when the service providing node is in a busy service state and cannot respond to the service request in time, the service receiving node may temporarily stop requesting to establish a physical transmission link with the service providing node. That is, the network access procedures shown in FIG. 1 and FIG. 2 do not need to be performed temporarily, thereby reducing the waste of communication resources and reducing the energy consumption of the service receiving node at the same time.

In view of the above, the present disclosure provides an air interface design scheme for cross-layer optimization of wireless communication systems to realize the service request processing process. More specifically, service response state information that each service providing node can provide at an application layer may be directly mapped to the corresponding physical channel or reference signal on the physical layer, and the management node may send the service response state information mapped to the physical layer by broadcasting or multicasting within its service management range. In this way, each service receiving node can directly obtain the service response state information of one or more service providing nodes on the application layer at the physical layer to detect at the physical layer whether the service response state information of the service providing node requested by the service receiving node on the application layer meets the access conditions.

That is, the service receiving node may directly detect the service response state information of the service providing node to be requested on the physical layer, such as whether the service providing node can provide the requested service type or whether the service providing node is in an idle service state. In this way, the physical layer can first determine whether the service providing node can currently satisfy the service request initiated by the service receiving node. If the service request can be satisfied by the service providing node, the network access processing method in FIG. 1 or FIG. 2 can be execute; otherwise, the service receiving node can be directly prohibited from outputting the physical layer access request for the service providing node, that is, the network access processing method can be prohibited from being executed, thereby avoiding the waste of communication resources and reducing the energy consumption of the service receiving node.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

It should be noted that the word "example" in the embodiments of the present disclosure is used to represent giving an example, an illustration, or a description. Any embodiment or design scheme described as an "example" in this application should not be explained as being more preferred or having more advantages than another embodiment or design scheme. More specifically, such terms are used to present a concept or an implementation in a specific manner.

It will be understood that the term "system," "device," "unit," "module," and/or "block" used herein are one method to distinguish different components, elements, parts, section or assembly of different level. However, these terms may be displaced by another expression if they achieve the same purpose.

According to the specifications and claims in the present application, unless otherwise specified in the context, articles such as "a," "an," and/or "the" do not necessarily indicate singular forms, and also include plural forms. Generally, expressions such as "include" and "comprise" are only used to indicate specified steps or elements. However, listings of these steps and elements are not exclusive, and methods or devices may also include other steps or elements. An element proceeded by "comprises a . . . " does not, without more constraints, preclude the existence of additional identical elements in the process, method, article, or apparatus that comprises the element.

In the description of the present disclosure, unless otherwise specified, "/" represents an "or" relationship between a preceding object and a following object. For example, "A/B" may represent A or B. The term "and/or" used in this application merely describes an association relationship between associated objects, and represents three possible relationships. For example, "A and/or B" may represent three scenarios: A alone, both A and B, and B alone, where A and B may be singular or plural.

Further, in the present disclosure, relational terms such as first, second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, in the description of this application, "a plurality of" means two or more than two.

In the embodiments of the present disclosure, flowcharts are used to illustrate the operations performed by a system.

It is to be expressly understood, the operations before or after may or may not be implemented in order. Conversely, the operations may be performed in inverted order, or simultaneously. Besides, one or more other operations may be added to the flowcharts, or one or more operations may be omitted from the flowchart.

Figure 3:
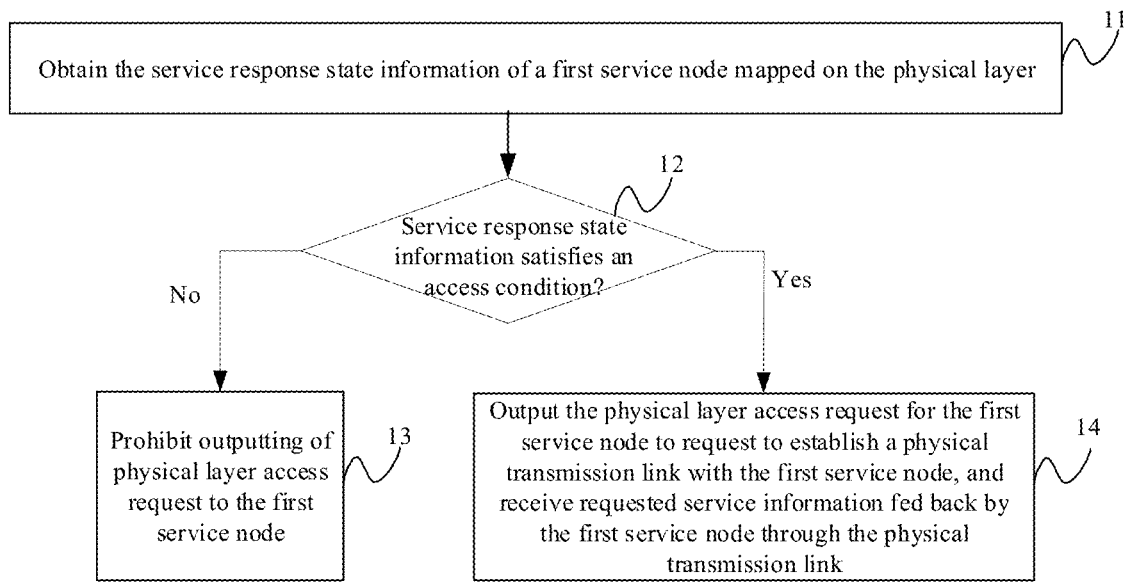
FIG. 3 is a flowchart of the service request processing method according to an embodiment of the present disclosure.

Referring to FIG. 3, which is a flowchart of the service request processing method according to an embodiment of the present disclosure. The method can be applied to wireless communication systems. For a typical wireless communication system, its system architecture generally includes a "management node" and a "device node," the "management node" may be configured to implement data transmission between the "device nodes" it serves through access control and wireless resource scheduling. In the practical application of the wireless communication system, each node may act as a "service receiving node" or a "service providing node" in the entire system when the functions currently being performed by each node at the application level are different. In some embodiments, the "service receiving node" may send a service request to the "service providing node." When the "service providing node" satisfies certain access conditions, the "service providing node" may confirm the successful service connection to the "service receiving node" through an air interface of the wireless communication system, and transmit the requested service information (such as business data) to provide the "service receiving node" the requested service.

Figure 4A:
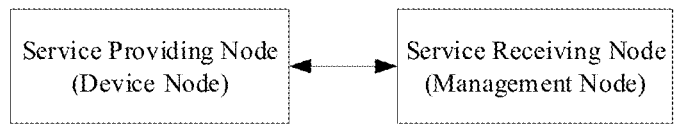
FIG. 4A is a schematic structural diagram of a wireless communication system applicable to the service request processing method and device according to an embodiment of the present disclosure.
Figure 4B:
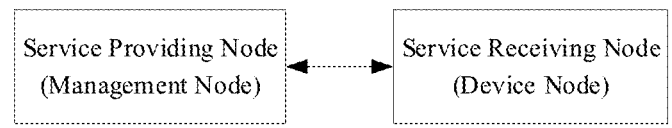
FIG. 4B is a schematic structural diagram of the wireless communication system applicable to the service request processing method and device according to an embodiment of the present disclosure.
Figure 4C:
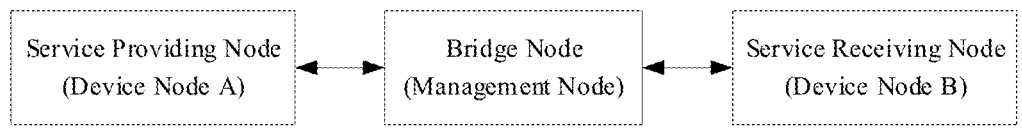
FIG. 4C is a schematic structural diagram of the wireless communication system applicable to the service request processing method and device according to an embodiment of the present disclosure.

It should be understood that in different application scenarios of the wireless communication systems, such as the wireless communication system architectures shown in FIG. 4A, FIG. 4B, and FIG. 4C, the devices serving as the 'service receiving nodes" and the "service providing nodes" may have certain differences, and their specific structures may vary depending on the actual needs, which will not be described in detail in the present disclosure.

The service request processing method provided in the present disclosure can be applied to the device nodes in the wireless communication system described above, that is, suitable for electronic devices. These electronic devices may include, but are not limited to, smartphones, tablet computers, wearable devices, personal computers (PCs), netbooks, smart watches, augmented reality (AR) devices, virtual reality (VR) devices, in-vehicle devices, smart speakers, robots, desktop computers, multimedia devices, and wireless network devices. As described above, in wireless communication systems of different application scenarios, the electronic device may be used as a service receiving node or a service providing node depending on the situation, which is not limited in the present disclosure.

The service request processing method will be described in detail below.

11, obtaining the service response state information of a first service node mapped on the physical layer.

In combination with the above description of the technical concept of the present disclosure, for each service providing node in the wireless communication system, that is, the computer devices that can provide services to external devices, the service providing node may include, but is not limited to the electronic devices listed above, and may also include servers, etc. The present disclosure does not limit device type of the service providing node. In the present disclosure, each service providing node can obtain the service response state information of the service providing node that can provide the requested service at the physical layer, especially whether the service providing node is in an idle service state at the application layer, thereby ensuring that the service providing node can respond to the service request sent by the service receiving node in time.

In the embodiments of the present disclosure, the service response state information of each service providing node at the application layer may be mapped to the corresponding bearer object of the physical layer in advance, such as the communication channel, the reference signal corresponding to the communication channel, etc. The present disclosure does not limit the method of implementing the mapping process, which can be set based on actual needs.

In this way, for any service receiving node that wishes to obtain a service from a service providing node (which may be noted as the first service node), that is, obtaining the data resources provided by the service providing node to realize the service, before requesting to establish a physical transmission link with the first service node, the service receiving node may first obtain the service response state information of the first service node mapped at the physical layer from the physical layer, that is, mapping the service response state information of the first service node at the application layer to the corresponding service response state information at the physical layer in advance.

In some embodiments, the service response state information may include, but is not limited to, the service type that the first service node can provide at the application layer, the service state (such as the busy/idle service state) at the application layer, etc. The present disclosure does not limit the content included in the service response state information and the mapping method on the physical layer, which can be set based on actual needs.

12, determining whether the service response state information satisfies an access condition, if so, proceed to the process at 14; otherwise, proceed to the process at 13.

In the embodiments of the present disclosure, the access condition may refer to the condition that the service node sends a service request for the first service node that the first service node can respond to the service request in a timely and reliable manner, feed back the requested service information to the service node, and satisfy the service request requirements of the service node. The present disclosure does not limit the specific content included in the access condition, which generally matches the content included in the obtained service response state information.

In some embodiments, the access condition may include that the corresponding service providing node can provide the service of the service type requested by the service receiving node at the application layer, and its current stage is in the idle service state: or, the corresponding service providing node is in the idle service state on the application layer, thereby ensuring the timeliness of responding to the service request.

In some embodiments, the service response state information may also include access permission information, that is, information related to the permission to access the first service node, or permission information to use the service provided by the first service node, etc., which is not limited in the embodiments of the present disclosure. In this case, during the execution of the process at 12, whether the service node has the permission to access the first node may be detected at the physical layer. The present disclosure does not limit the content included in the access condition, which may include, but is not limited to, the types of access conditions listed in the present disclosure and their corresponding detection methods.

13, prohibiting outputting of physical layer access request to the first service node.

14, outputting the physical layer access request for the first service node to request to establish a physical transmission link with the first service node, and receiving requested service information fed back by the first service node through the physical transmission link.

In some embodiments, when the electronic device (i.e., the service node) detects that the service providing node (such as other device nodes or management nodes) requested at the current stage cannot provide the requested service on the physical layer, the service quality cannot be ensured as the service providing node is in the busy state, and the service node does not have the access permission of the first service node (i.e., authentication failure), etc. In order to avoid waste of invalid occupation of the communication resources and unnecessary energy consumption of the service node, the service node may be directly prohibited from outputting the physical layer access request for the first service node. That is, in the case of this detection result, the service node does not need to perform the network access process shown in FIG. 1 and FIG. 2. In this way, for the ultra-low delay transmission service, the overhead of the network access can be avoided, that is, the waste of wireless transmission resources caused by the continuous occupation of the wireless network can be avoided, and the energy consumption of the device node can be reduced.

Figure 2:
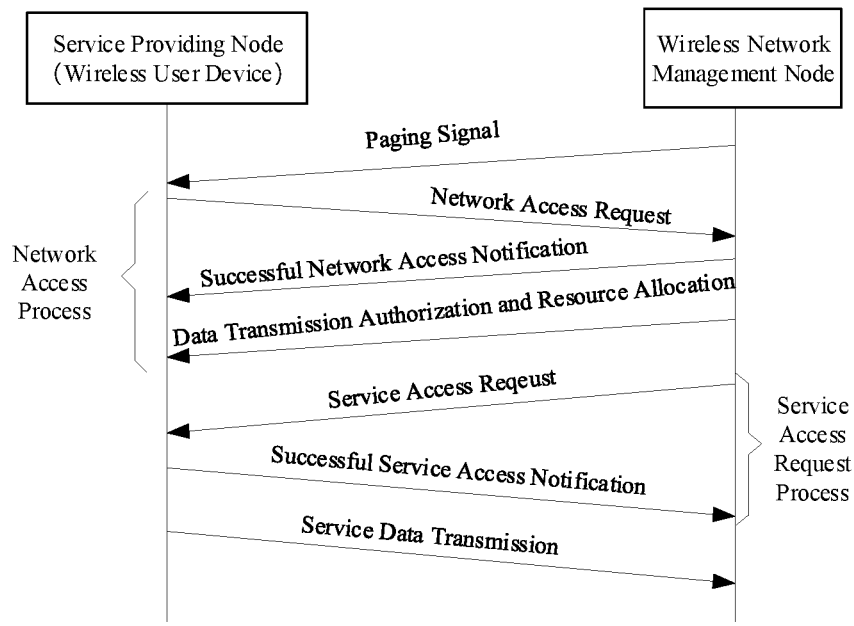
FIG. 2 is a flowchart of another service request processing method in conventional technology.

Conversely, after the detection on the physical layer described above, if it is determined that the service response state information of the first service node at the application layer satisfies the access condition, for example, the service node has the access permission of the first service node, or the first service node is in the idle service state and can provide the requested service in time, the physical layer access request for the first service node may be output in the manner shown in FIG. 1 or FIG. 2. That is, the network access process can be performed to request to establish the physical transmission link with the first service node, and receive the requested service information fed back by the first service node through the physical transmission link. That is, the subsequent service access process can be performed, which satisfies the service request requirements of the service node for the first service node.

Consistent with the present disclosure, for each service providing node on the application layer, its service response state information at the application layer can be mapped to the physical layer. In this way, in the scenario where the service node needs to request a certain type of service from the first node service, before requesting to establish a physical transmission link with the first service node, the service response state information of the first service node mapped on the physical layer can be directly obtained, and whether the service response state information satisfies the access condition on the physical layer can be detected. If the access condition is satisfied, the physical layer access request can be output and a physical transmission link with the first service node can be established to receive the requested service information fed back by the first service node through the physical transmission link. If the access condition is not satisfied, it indicates that the first service node cannot provide the requested service information required by the service node in time, and the output of the physical layer access request for the first service node can be prohibited. In this way, the invalid physical layer access and resource request process before the service connection is successfully established can be avoided, the energy consumption and invalid occupation of physical resources can be reduced, and the success rate of service access can be improved.

Figure 5:
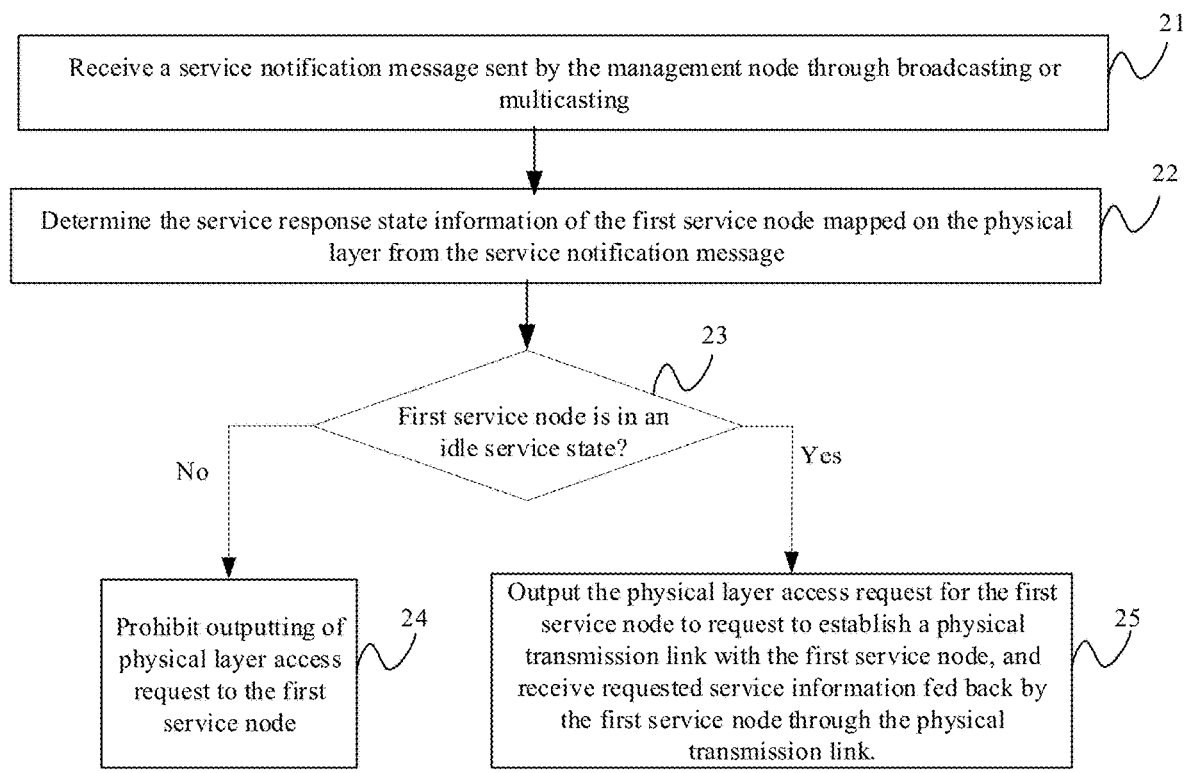
FIG. 5 is a flowchart of the service request processing method according to an embodiment of the present disclosure.

FIG. 5 is a flowchart of the service request processing method according to an embodiment of the present disclosure. This embodiment may be an optional refinement implementation method of the service request processing method described above, but the refinement implementation method is not limited thereto. In practical applications, the electronic device for implementing the service request processing method may exist as a "service receiving node," and reference may be made to the wireless communication system structure shown in FIG. 4B and FIG. 4C. The service request processing method will be described in detail below.

21, receiving a service notification message sent by the management node through broadcasting or multicasting.

In the embodiments of the present disclosure, the service notification message may include the service response state information mapped to the physical layer by each service node located within the service management range of the management node. That is, for any service node that can provide external services, that is, a service node that exists as a service providing node in the application layer, its current state information (or service response state information) at the application layer may be sent to the management node within its service management range to update the service state (or the service response state information) corresponding to the service providing node mapped by the management node on the physical layer.

In some embodiments, the service providing node may also detect that the current service state has changed relative to a locally stored service state, and then send the current service state to the corresponding management node to update the service state corresponding to the service providing node mapped by the management node on the physical layer. Therefore, in order to ensure the reliability of the service response state information of each service providing node mapped to the physical layer, each service providing node may need to actively or passively report the current state information to the management node in real time or at fixed time intervals. The specific implementation process may include, but is not limited to, the methods described above. In addition, the reporting and physical layer mapping update processes of the service types that can be provided by each service providing node are similar, and will not be described in detail in the present disclosure.

It should be understood that when the management node exists as a service providing node, there is no need to report. The management node may directly update the corresponding service response state information mapped to the physical layer by using the service response state information of the management node in the application layer that the management node has detected. The specific implementation process is similar to the implementation process described above, which will not be described in detail in the present disclosure.

Based on the above analysis, for the management node, it may obtain the service response state information on the application layer of each service providing node located in its service management range in advance. Subsequently, the service notification message including the service response state information mapped to the physical layer may be sent to each service receiving node within its service management range by means of periodic broadcast or multicast. In this way, each service receiving node can obtain the service response state of other service nodes on the application layer at the current stage on the physical layer.

It should be noted that for the same electronic device, in different application scenarios, it may exist as a service receiving node or a service providing node. Therefore, the electronic device may either send the service response state information to its corresponding management node, or receive service notification messages broadcast or multicast by the management node to obtain the service response state information of other electronic devices. In this way, each service node located within the service management range of the same management node can obtain each other's service response state information at the application layer on the physical layer. It should be noted that the present disclosure does not limit the output form of the service notification message, which may include, but is not limited to, synchronization signals, broadcast channel bearer information, reference signals, etc., which can be set based on actual needs.

22, determining the service response state information of the first service node mapped on the physical layer from the service notification message.

In some embodiments, for the obtained service response state information of each service providing node mapped on the physical layer, the service response state information of the first service node mapped on the physical layer may be looked up based on the unique node identifiers (such as node names, identifications, node numbers, etc.) of different service providing nodes.

In some embodiments, the look up method for the service response state information of the first service node mapped on the physical layer may be determined based on the agreement of the service response state information of different service providing nodes included in the service notification message mapped on the physical layer, which is not limited in the present disclosure.

23, determining whether the first service node is in an idle service state based on the service response state information mapped to the physical layer by the first service node: if not, proceed to the process at 24; otherwise, proceed to the process at 25.

In the embodiments of the present disclosure, it is assumed that the first service node can provide the service requested by the service node. When the user knows that the first service node can provide the required service, the user may initiate a service request to the first service node. Therefore, in the present disclosure, after knowing the service response state information of the first service node mapped on the physical layer at the physical layer, whether the first service node is in the idle service state at the application layer at the current stage may be directly detected. That is, if the service node sends a service request to the first service node, whether the first service node can respond to the service request in time can be detected. The specific detection implementation manner can be determined based on the output form of the corresponding service response state information, which will not be described in detail in the present disclosure.

It should be understood that the service response state information of the first service node mapped on the physical layer may include the service state of the first service node at the application layer at the current stage, such as the idle service state or the busy service state. In practical applications, the service state may be used to identify whether the first service node currently can ensure the newly accessed service request, that is, whether the first service node can respond to the newly access service request in time.

In generally, when the configurable physical resources are sufficient, the service state information may be further described. For example, if the first service node is currently in a "high load" working stage, its service state may be expressed as the "busy service state." Conversely, if the first service node is current in a "low load" working state, its service state may be expressed as the "busy service state." The present disclosure does not limit the specific method of determining the service stage of the first service node.

24, prohibiting outputting of physical layer access request to the first service node.

25, outputting the physical layer access request for the first service node to request to establish a physical transmission link with the first service node, and receiving requested service information fed back by the first service node through the physical transmission link.

For the specific implementation processes of the processes at 24 and 25, reference can be made to the descriptions of the corresponding parts of the foregoing embodiments, which will not be repeated here.

In practical applications, for the wireless communication systems shown in FIG. 4B and FIG. 4C, based on the above method, when it is detected that the service response state information of the first service node (i.e., the service providing node) satisfies the access condition, the server node may send a physical layer access request, that is, the network access request" for the first service node to the management node. Specifically, a contention or non-contention access method may be used to request transmission resources, and the specific access implementation process will not be described in detail.

After receiving the physical layer access request, the management node may determine the corresponding basic physical layer configuration information based on the physical resource conditions, thereby solving the access conflict issue that may exist in the contention access method. When there are sufficient physical resources, as shown in FIG. 1 or FIG. 2, the management node may feed back the physical layer access success identifier to the service node, such that the service node can send subsequent service requests accordingly. At the same time, the management node may authorize transmission to the service node and allocate the corresponding transmission resources through the established physical transmission link, such that the service can send the service request to the first service node through the physical layer resource (i.e., the physical transmission link), receive the requested service information fed back by the first service node in response to the service request, thereby satisfying the service request of the service node.

Consistent with the present disclosure, each service providing node can report its service state at the application layer to the management node, and map its service state to the physical layer, and the management node can send the service state of each service providing node mapped on the physical layer to each service receiving node within its service management range by broadcasting or multicasting. In this way, for any service receiving node, the service state of the first service node at the application layer that the service receiving node will request the service can be looked up directly at the physical layer. As such, when it is determined that the first service node is in a busy service state, there is no need to occupy physical layer resources and send the physical layer access request for the first service node, thereby avoiding resource waste and saving the energy consumption of the service node.

Figure 6:
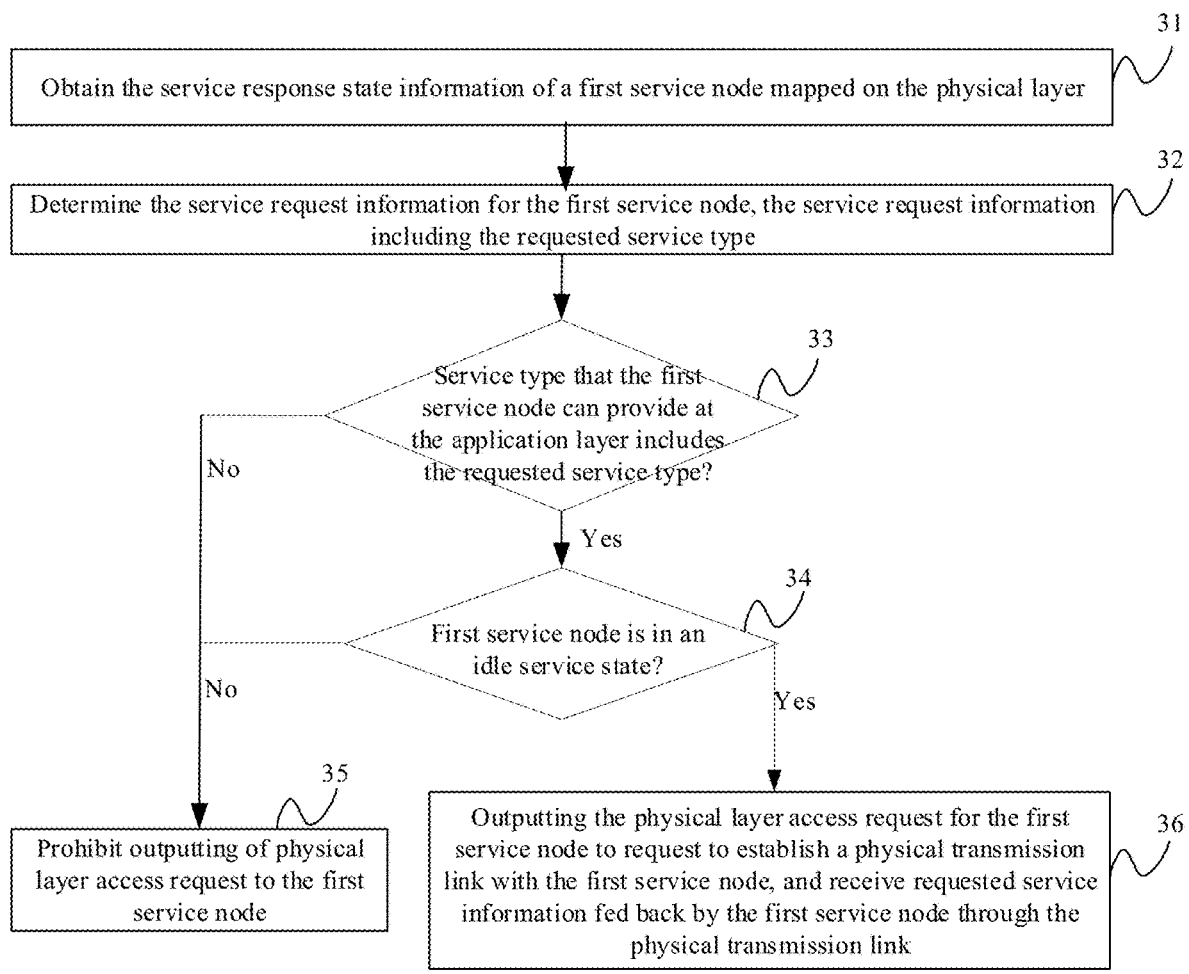
FIG. 6 is a flowchart of the service request processing method according to an embodiment of the present disclosure.

FIG. 6 is a flowchart of the service request processing method according to an embodiment of the present disclosure. This embodiment may be an optional refinement implementation method of the service request processing method described above. The service request processing method will be described in detail below.

31, obtaining the service response state information of a first service node mapped on the physical layer.

For the implementation process of the process at 31, reference can be made to the description of the corresponding part in the foregoing embodiments, which will not be repeated here.

32, determining the service request information for the first service node, the service request information including the requested service type.

For the service node, the type of service it wants to obtain from the first service node may be determined based on the user's input operation to the service node, or it may be determined based on the content of the request initiated by the application currently being executed by the service node. The present disclosure does not limit the method of determining the service type (i.e., the service request information) requested by the service node. In addition, the content included in the service request information is not limited to the requested service type.

In some embodiments, the service type of the requested service may be determined based on the data type or other information required for the execution of the service, such as the realization of data transmission of voice, video, or text files. The present disclosure does not limit the identification content of different service types, which can be set based on actual needs.

33, determining whether the service type that the first service node can provide at the application layer includes the requested service type based on the service response state information, if so, proceed to the process at 34; otherwise, proceed to the process at 35.

In some embodiments, after determining the service type that the service node wishes to request from the first service node, whether the first service node can provide the service of the service type may be first determined at the physical layer. Therefore, the service response state information mapped to the physical layer by the first service node can be queried. More specifically, whether the service type of each service that the first service node can provide includes the service type of the service requested by the service node may be queried. For example, the query operation may be implemented by using the service type identifier comparison method, but is not limited in the present disclosure.

34, determining whether the first service node is in an idle service state based on the service response state information, if so, proceed to the process at 35; otherwise, proceed to the process at 36.

35, prohibiting outputting of physical layer access request to the first service node.

36, outputting the physical layer access request for the first service node to request to establish a physical transmission link with the first service node, and receiving requested service information fed back by the first service node through the physical transmission link.

Based on the physical layer detection method described above, if it is determined that the first service node cannot provide the service requested by the service node at the application layer, in order to avoid waste of transmission resources, the service node may no longer sends the physical layer access request to the first service node to request the establishment of a physical transmission link with the first service node. Subsequently, the service node may initiate a service request to other service providing nodes (i.e., other service nodes different from the first service node), and the specific implementation process is similar to the process described in the foregoing embodiments, which will not be described in detail in the present disclosure.

For the other service providing nodes described above, the service node can still query the service response state information of each service providing node on the physical layer, select the service providing node that is in the idle service state at the current stage and can provide service type requested by the service node, determine the service providing node as the target service node, output the physical layer access request for the target service node, and use the method described above to transmit the required service request information through the physical transmission link established with the target service node.

Regarding the implementation process of the service node directly implementing the service state detection of the first service node at the physical layer after the service state of each service providing node at the application layer is mapped to the physical layer, reference can be made to the descriptions of the corresponding parts of the foregoing embodiments, which will not be repeated here. It should be noted that the execution sequence between the detection process of the whether the service type that the first service node can provide includes the requested service type and the detection process of whether the first service node is in an idle service state may include, but are not limited to, the implementation sequences described above. In some embodiments, the detection processes may be executed at the same time, or the service state may be detected first, and then the service type that can be provided may be detected later, which can be set based on actual needs.

Consistent with the present disclosure, when the service node wants to obtain the service of the first service node, the service node can first detect at the physical layer whether the service type that the first service node can provide at the application layer includes the service type of the requested service, and whether the first service node is in an idle service state at the application layer at the current stage, thereby ensuring that the first service node can reliably and timely respond to the service request sent by the service node. Once it is determined that one of the detection results is negative, the service does not need to waste transmission resources to send the service request to the first service node to save unnecessary energy consumption.

Of course, after the above detections, if it is determined that the first service node can provide the service requested by the service node in time, a physical layer access request for the first service node may be sent directly to establish a physical transmission link with the first service node. Then, a service request for the first service node can be sent, such that the service node can receive the requested service information fed back by the first service node through the physical transmission link, thereby meeting the service requirement of the service node.

Figure 7:
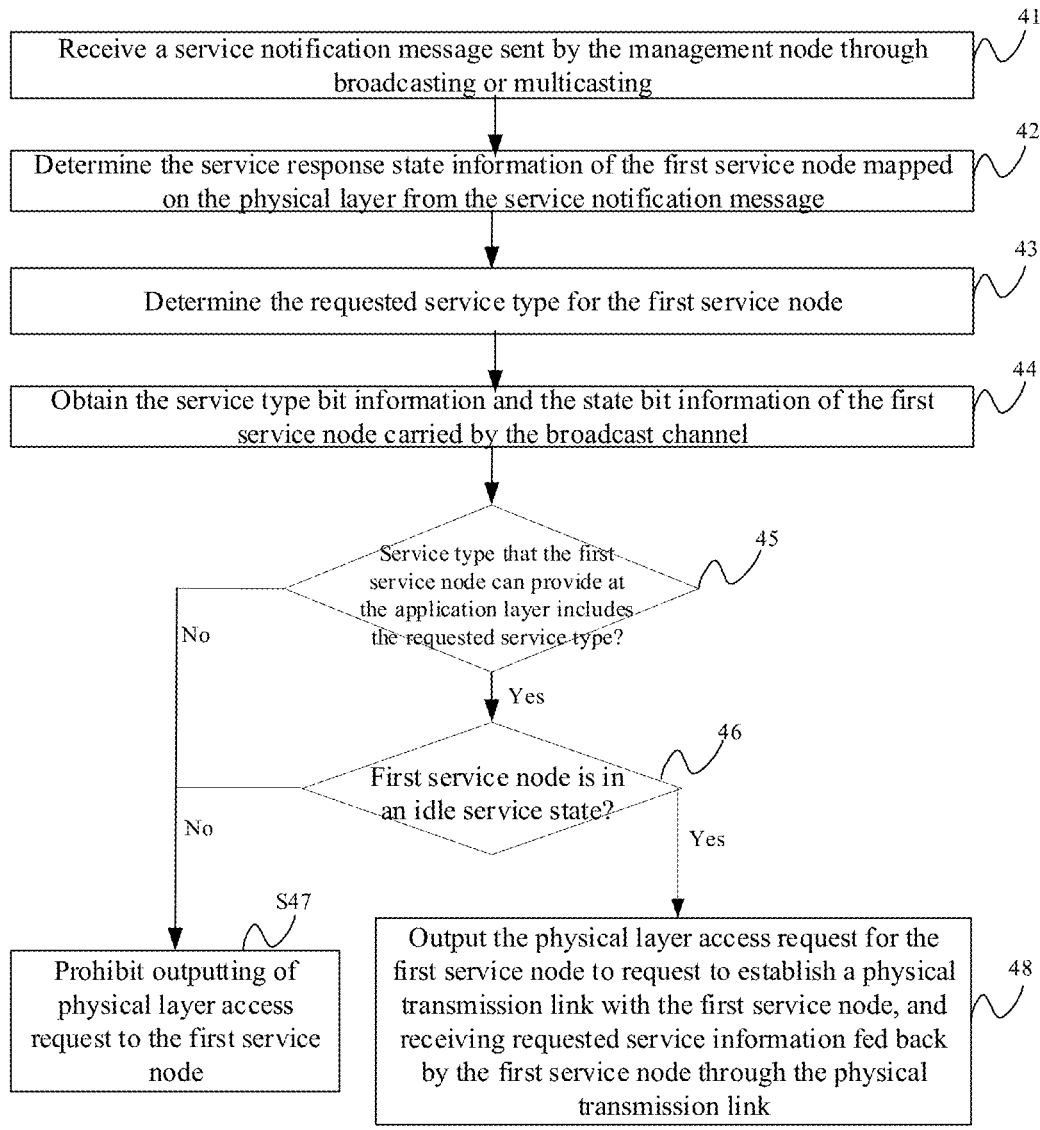
FIG. 7 is a flowchart of the service request processing method according to an embodiment of the present disclosure.

FIG. 7 is a flowchart of the service request processing method according to an embodiment of the present disclosure. This embodiment may be an optional refinement implementation method of the service request processing method described above. The service request processing method will be described in detail below.

41, receiving a service notification message sent by the management node through broadcasting or multicasting.

In some embodiments, the service notification message may include the service response state information mapped to the physical layer by each service node located within the service management range of the management node. The service management range may be determined based on the performance of the management node, the configuration requirements of the wireless communication system, and other factors. In general, one or more service nodes corresponding to different management nodes may be different, and there may also be partially overlapping service nodes, etc. depending on the situation, which is not limited in the present disclosure.

It should be understood that in the process of the management node periodically broadcasting the synchronization signal and system information, any device node serving as a receiving node may establish time and frequency synchronization with the management node by detecting the synchronization signal, thereby obtaining the basic network configuration information from the system information. At the same time, the service response state information of the node that wants to request the service from the service providing node may be determined from the synchronization signal or the broadcast channel bearer information. The specific implantation process will not be described in detail in the present disclosure.

42, determining the service response state information of the first service node mapped on the physical layer from the service notification message.

43, determining the requested service type for the first service node.

For the implementation process of the processes at 41-43, reference can be made to the description of the corresponding part in the foregoing embodiments, which will not be repeated her 44, obtaining the service type bit information and the state bit information of the first service node carried by the broadcast channel.

Combined with the above description of the service providing node mapping its service response state information at the application layer to objects such as the communication channels or reference signals of the physical layer, that is, mapping the defined information (i.e., the basic information related to the service request, such as the service type, service state, etc. described above) to the air interface parameters with broadcasting properties (such as the synchronization signals, broadcast channels bearer information or reference signals) of the physical layer, an embodiment of the present disclosure proposes to map and broadcast the information of the service type that each service providing node (which includes the first service node) can provide to several bits carried by the broadcast signal, such as mapping to the mater information block (MIB) and the system information block (SIB) as the basic system configuration information. In this way, the service node located in the management range of the service may determine the information such as the service type of the service providing node mapped to the physical layer through the received broadcast signal.

For the convenience of description, in the embodiments of the present disclosure, each piece of bit information of the broadcast channel may be mapped to the bit information of the service type (such as the service type identifier) that the first service node can provide the service, which may be noted as the service type bit information. It should be noted that the present disclosure does not limit the bits for mapping the service type on the broadcast channel, which can be set based on actual needs.

Similarly, the "busy" or "idle" identifier of the service state identifier of each service providing node on the application layer may be mapped to single-bit information, which may be noted as the state bit information. The present disclosure does not limit the bits for mapping the service state on the broadcast channel. It should be understood that the service state of the same service providing node at the application layer may not be fixed. As the load changes, the service providing node may change accordingly, which may require periodic or real-time reporting of its current service state to update the service state mapped to the physical layer to ensure that the service state of the corresponding service providing node recorded in the state bit information obtained by each service receiving node is accurate and reliable.

In the embodiments of the present disclosure, after receiving the broadcast signal sent by the management node, the service node may obtain the service type bit information and the state bit information of the first service node, that is, the service type that the first service node can provide and the service state at the current stage, from the information carried by the broadcast channel of the physical layer.

45, detecting whether the service type that the first service node mapped by the service type bit information can provide at the application layer includes the requested service type: if so, proceed to the process at 46; otherwise proceed to the process at 47.

46, detecting the service state mapped by the state bit information to determine whether the first service node is in an idle service state at the application layer: if so, proceed to the process at 47; otherwise, proceed to the process at 48.

In some embodiments, the service type bit information mapped by different service types may be different, and the state bit information mapped by different service states may also be different. Therefore, in the present disclosure, based on the actually obtained service type bit information and the state bit information of the first service node, the service type that the first service node can provide at the current stage, and the service state of the first service node may be determined. Based on this, whether the first service node can provide the service of the service type required by the service node in time may be determined. For the specific implementation process, reference can be made to the detection processes described in the corresponding parts of the foregoing embodiments, which will not be repeated here.

47, prohibiting outputting of physical layer access request to the first service node.

48, outputting the physical layer access request for the first service node to request to establish a physical transmission link with the first service node, and receiving requested service information fed back by the first service node through the physical transmission link.

For the specific implementation processes of the processes at 47 and 48, reference can be made to the descriptions of the corresponding parts of the foregoing embodiments, which will not be repeated here.

Consistent with the present disclosure, the service type of each service that each service providing node can provide on the application layer and the service state at the current stage to the corresponding bits carried by the broadcast channel may be mapped on the physical layer in advance to determine the corresponding service type bit information and the state bit information. In this way, when any service node wishes to obtain a certain type of service from another service node, after receiving the broadcast signal sent by the management node at the physical layer, the service type bit information and the state bit information of the first service node carried by the broadcast channel can be queried. Based on this, whether the first service node can provide the requested service and whether the first service node is in an idle service state at the current stage can be detected. If it is detected that a certain detection result is negative, the service node does not need to send a physical layer access request for the first service node, thereby reducing the occupation of additional resources caused by network access and service access, and reducing the energy consumption of the device node.

Figure 8:
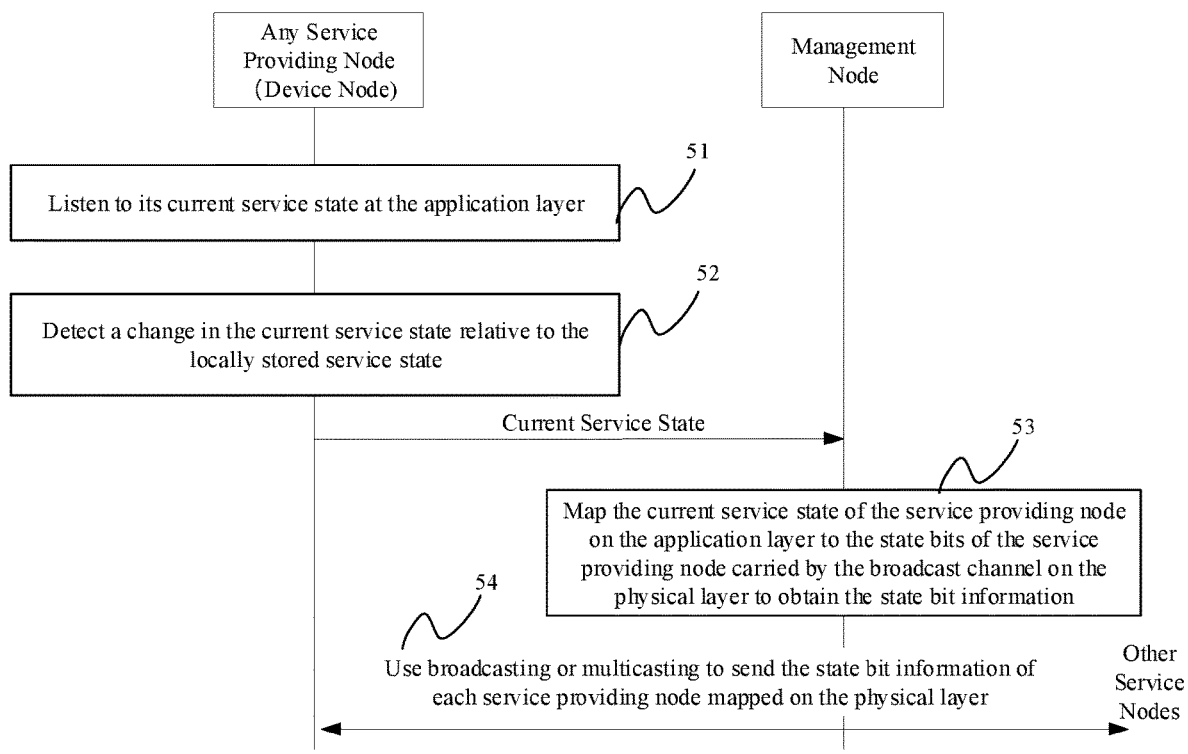
FIG. 8 is a flowchart of the service request processing method according to an embodiment of the present disclosure.

FIG. 8 is a flowchart of the service request processing method according to an embodiment of the present disclosure. This embodiment may be an optional refinement implementation method of the service request processing method described above. The service request processing method will be described in detail below.

51, the service providing node listens to its current service state at the application layer.
52, the service providing node detects that the current service state has changed relative to the locally stored service state, and sends the current service state to the corresponding management node.
53, the management node maps the current service state of the service providing node on the application layer to the state bits of the service providing node carried by the broadcast channel on the physical layer to obtain the state bit information.
54, the management node uses broadcasting or multicasting to send the state bit information of each service providing node mapped on the physical layer.

It should be understood that for any service providing node, the received state bit information sent by the management node through broadcasting or multicasting may be the state bit information that maps the service state of other service providing nodes at the application layer at the current stage, and there may be no need to obtain the state bit information of the service providing node. In addition, the mapping of the service type bit information is similar to the broadcasting/multicasting implementation process, which will not be described in detail in the present disclosure.

In some embodiments, when detecting the synchronization signal or system information broadcasted or multicasted by the management node, determining the signal or specific bit information mapped to the physical layer, and obtaining the service state and/or the type of service that can be provided, the basic physical layer configuration information may also be obtained such that the physical transmission link can be established accordingly. The present disclosure does not limit the content of the physical layer configuration information, which may be set based on actual needs.

The embodiments of the present disclosure use an example scenario in which single-bit information of service state information is configured in the information bearer of a broadcast signal to illustrate the implementation of mapping the service state of each service providing node on the application layer to the physical layer. In this way, each service providing node can obtain the service state of each service providing node on the application layer at the physical layer, and determine whether the current stage is suitable for sending a service request for a service providing node accordingly, thereby avoiding accessing service requests to the service providing node in the busy service state, which requires the service node to wait for a long time, resulting in waste of resources and reduction of processing efficiency and reliability of the service request.

Different from the mapping definition described in the foregoing embodiments of requesting service-related information to the air interface parameters with broadcast properties of the physical layer, and still taking the mapping scenario of the above service state as an example, the service state may also be mapped to different reference signals corresponding to the broadcast channel. In this case, for any service providing node, after report the service type of service it can provide and the service response state information such as the service state at the current stage to the management node, the management node may map the service state in the service response state information to a certain reference signal corresponding to the broadcast channel on the physical layer, thereby obtaining a first mapping relationship between different service states and different reference signals. The present disclosure does not limit the method of determining and expressing the first mapping relationship. It should be understood that the content of the reference signal mapped to different service states may be different, but the specific content of the reference signal is not limited in the present disclosure, which can be set based on actual needs.

In some embodiments, in the process of detecting whether the first service node that provides the requested service to the service node is in an idle service state on the application layer at the current stage, after receiving the synchronization signal or system information (such as MIB, SIB, etc.) sent by the management node using the broadcast/multicast method, the reference signal corresponding to the broadcast signal may be determined. Based on a predetermined first mapping relationship between different service states and different reference signals, the reference signal corresponding to the broadcast channel determined this time may be used to determine whether the first service node is in an idle service state at the application layer. That is, in the first mapping relationship, whether the service node mapped by the reference signal corresponding to the broadcast channel is in the idle service state can be determined. The specific implementation process will not be described in the present disclosure.

For a service receiving node, after the physical layer signal detection described above, if the service type provided by the first service node (any service providing node) includes the service type that the service node wishes to request, and the first service node is in an idle service state at the application layer at the current stage, the service node may start the subsequent physical layer access process, and send the service request service information based on the allocated physical layer resources. Otherwise, the service node may not need to start the subsequent physical layer access process, but may monitor the broadcast signal or channel sent by the management node until the access condition is met, and start the physical layer process for the corresponding service providing node. In this way, the waste of resources caused by directly starting the physical layer access process when the service providing node cannot provide the service required by the service node in time can be avoided, and the success rate of service request access can be improved.

In other embodiments, the service nodes may be mapped to different synchronization signals. In this way, the device node may blindly detect the synchronization signal periodically sent by the broadcast node, and determine the service node of the service providing node corresponding to the synchronization signal obtained this time by analyzing the sequence characteristics of the synchronization signal. The specific implementation process is not limited in the present disclosure.

Based on the above analysis, for any service providing node, after report the service type of service it can provide and the service response state information such as the service state at the current stage to the management node, the management node may map the service state in the service response state information to the synchronization signal corresponding to the broadcast signal on the physical layer, thereby obtaining a second mapping relationship between different service nodes and different synchronization signals. The present disclosure does not limit the method of determining and expressing the second mapping relationship.

After determining the second mapping relationship, in the process of detecting whether the first service node that provides the requested service to the service node is in an idle service state on the application layer at the current stage, after receiving the synchronization signal sent by the management node using the broadcast/multicast method, whether the first service node is in an idle service state at the application layer may be determined by using the received synchronization signal corresponding to the first service node based on the second mapping relationship between different service states and different synchronization signals. That is, whether the service state mapped by the synchronization signal corresponding to the received first service node is in the idle service state can be determined. The specific implementation process will not be described in the present disclosure.

The service request processing methods described in the foregoing embodiments mainly take a device node as a service receiving node to make a service access request, such as an application of a content (such as a video, etc.) distribution service with the system structure shown in FIG. 4A, or a wireless communication system with a self-organized network topology, such as the system structure shown in FIG. 4C (e.g., an application scenario for wireless network construction and transmission capability provision in a vehicle environment) as examples to describe the technical solutions of the present disclosure. The following description takes the wireless communication system as shown in FIG. 4B with the management node as the service receiving node and the device node as the service providing node as an example to describe the service request processing method. Specifically, it may include, but is not limited to, service request scenarios related to environmental detection, such as a network device node sensing/detecting environmental data through cameras or radars, and sending the collected data to a service receiving node for analysis and processing to meet the application requirements.

Figure 9:
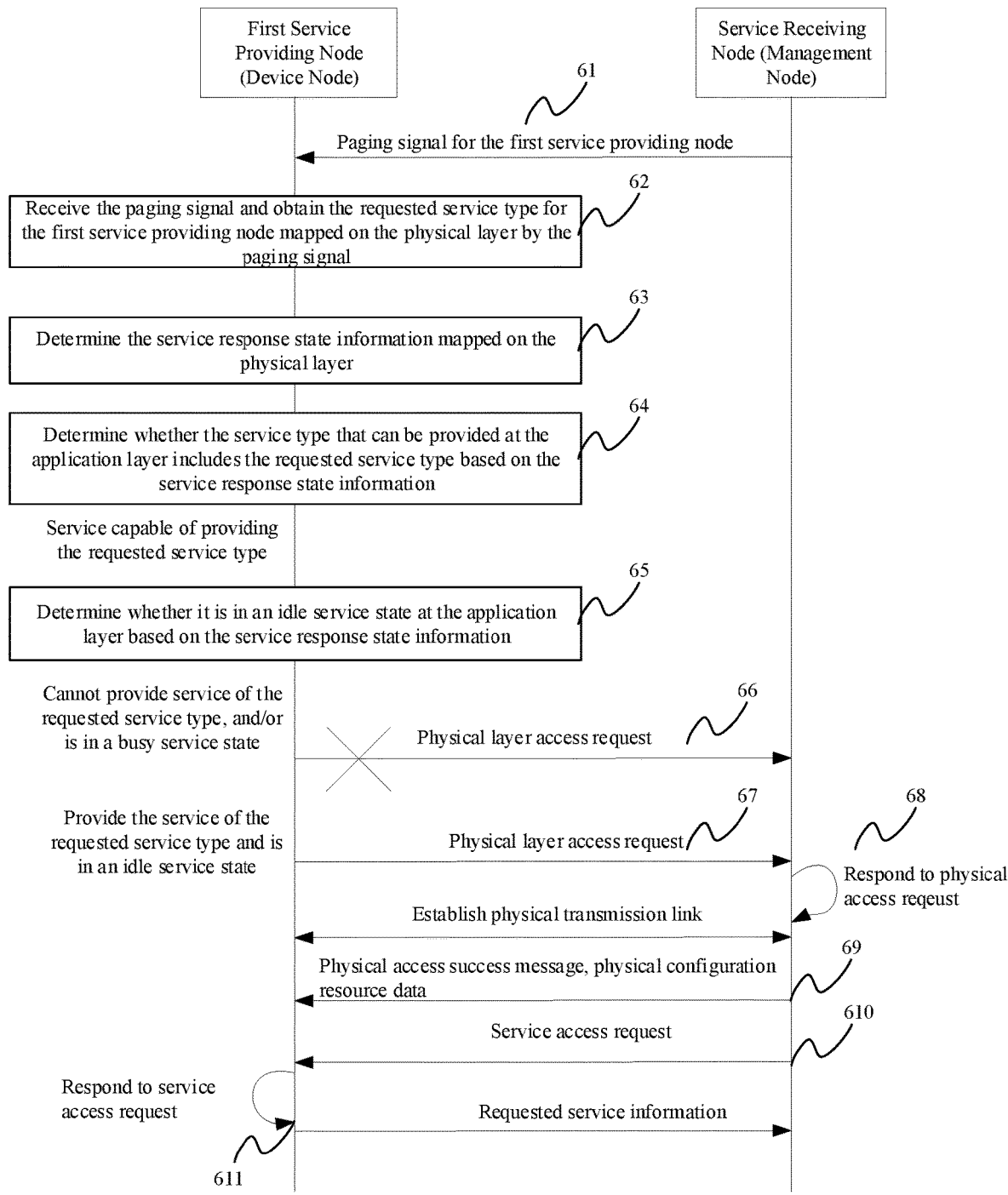
FIG. 9 is a flowchart of the service request processing method according to an embodiment of the present disclosure.

FIG. 9 is a flowchart of the service request processing method according to an embodiment of the present disclosure. The method will be described in detail below.

61, the management node sends a paging signal for a first service providing node.

It should be understood that before performing the process at 61, each service providing node located within the service management range of the management node may report its latest service state to the management node by using the methods described above to update the corresponding service state mapped to the physical layer for the management node to inform each service receiving node within its service management range through broadcasting or multicasting. For the specific implementation process, reference can be made to the corresponding parts in the foregoing embodiments.

In the embodiments of the present disclosure, the management node may exist as a service receiving node at the application layer. Referring to the wireless communication system structure shown in FIG. 4B, the management node may update its service state periodically or in real time to ensure that the service state of the management node mapped to the physical layer is reliable.

Based on the above analysis, in the process of requesting service, a device node serving as the service providing node that can be paged within the network coverage of the management node (i.e., within the service management range), that is, any service providing node that can provide the required service for the management node, may be noted as the first service providing node in the present disclosure. The first service providing node may include any of the electronic devices listed above, and the present disclosure does not limit the content of the paging signal and its output manner.

62, the first service providing node receives the paging signal, and obtains a requested service class for the first service providing node mapped on the physical layer by the paging signal.

63, the first service providing node determines its service response state information mapped in the physical layer.

64, the first service providing node determines whether the service type that is can provide at the application layer includes the requested service type based on the service response state information, if so, proceed to the process at 65; otherwise proceed to the process at 66.

65, the first service providing node determines whether it is in an idle service state at the application layer based on the service response state information, if not, proceed to the process at 66; otherwise proceed to the process at 67.

66, the first service providing node prohibits sending the physical layer access request to the management node, and continues to wait for the next paging signal.

After a looped the first service providing node receives the paging signal sent by the management node, before outputting a network access request to the management node to obtain transmission resources, the first service providing node may first determine whether it can provide the service requested by the management node, and whether the service state at the application layer is the idle service state. That is, to determine whether the service of the first service providing node is visible, and the entire determination process may be implemented at the physical layer of the first service providing node (i.e., any device node). The specific determination processes of the service type and the service state that can be provided are similar to the detection processes described in the corresponding parts of the foregoing embodiments, which will not be repeated here.

It should be noted that when the service of the first service providing node is visible, that is, the determination results are all positive, the first service providing node may prepare the subsequent physical layer access process. Otherwise, the subsequent physical layer access process may no be continued. That is, the first service providing node may be prohibited from sending a physical layer access request to the management node, and the first service providing node may continue to wait for the next paging signal to be sent by the management node.

In this way, the device node may directly complete the service provision and service state query requested by the service receiving node at the physical layer, which avoids unnecessary wireless access and resource request processes before successfully obtaining service access, avoid waste of resources, and reduces the delay of successful service access.

67, the first service providing node sends a physical layer access request to the management node.

68, the management node establishes a physical transmission link with the first service providing node in response to the physical layer access request.

69, the management node feeds back a physical access success message and physical configuration resource data to the first service providing node.

610, the management node sends a service request to the first service providing node.

611, the first service providing node responds to the service request and sends the requested service information to the management node through the physical transmission link.

In some embodiments, when the first service providing node determines at the physical layer that is can provide the service requested by the management node and it is in the idle service state at the application layer at the current stage, that is, the service is visible, the first service providing node may continue the physical layer access process, detect and accept the access service request of the physical layer, and continue the service request process after the physical layer connection is established. Since it is known that the first service providing node is in the idle service state at this time, it is ensured that the management node can successfully request the service. It can be seen that in the embodiments of the present disclosure, the state of the desired service in the network can be obtained while obtaining the basic information of physical layer transmission, thereby ensuring the success rate of the requested service after the subsequent physical layer is successfully accessed.

It should be noted that the physical layer access process and service access process performed when the service of the service providing node is determined to be visible in the above manner may include, but is not limited to, the description of the above processes. The specific implementation process can be adjusted based on actual needs, which will not be described in detail in the present disclosure.

Figure 10:
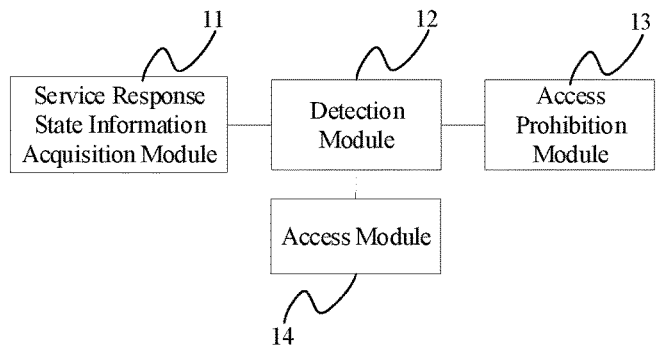
FIG. 10 is a schematic structural diagram of a service request processing device according to an embodiment of the present disclosure.

FIG. 10 is a schematic structural diagram of a service request processing device according to an embodiment of the present disclosure. The service request processing device can be applied to the device node of any wireless communication system as described above, which may include, but is not limited to, the electronic devices listed above. As shown in FIG. 10, the service request processing device includes a service response state information acquisition module 11, configured to obtain the service response state information of the first service node mapped on the physical layer: a detection module 12, configured to detect whether the service response state information satisfies the access condition; an access prohibition module 13, configured to prohibit outputting a physical layer access request for the first service node when the detection result of the detection module is negative; and an access module 14, configured to output a physical layer access request for the first service node when the detection results of the detection module is positive to request to establish a physical transmission link with the first service node, and receive the requested service information fed back by the first service node through the physical transmission link.

Figure 11:
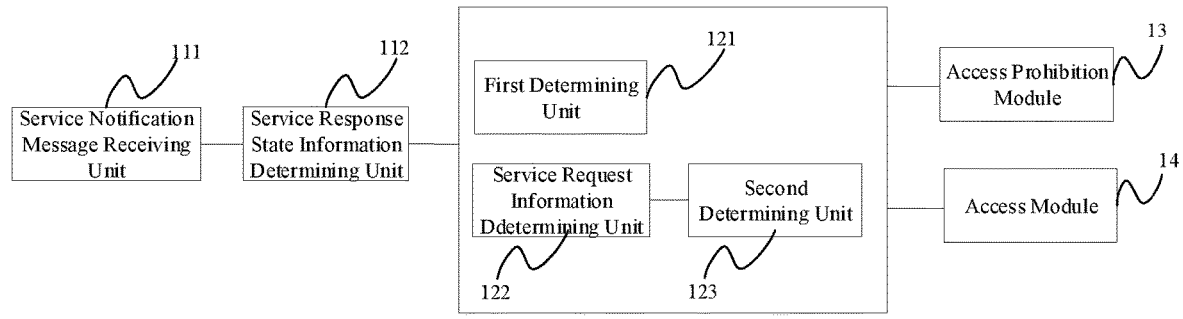
FIG. 11 is a schematic structural diagram of the service request processing device according to an embodiment of the present disclosure.

In some embodiments, as shown in FIG. 11, the service response state information acquisition module 11 may include a service notification message receiving unit 111, configured to receive a service notification message sent by the management node in a broadcast or multicast manner. In some embodiments, the service notification message may include the service response state information mapped to the physical layer by each service node located within the service management range of the management node. The service response state information acquisition module 11 further includes a service response state information determining unit 112, configured to determine, from the service notification message, the service response state information of the first service node mapped on the physical layer.

Referring to FIG. 11, in some embodiments, the detection module 12 may include a first determining unit 121, configured to determine whether the first service node is in an idle service state based on the service response state information of the first service node mapped on the physical layer.

Referring to FIG. 11, in some embodiments, the detection module 12 may also include a service request information determining unit 122, configured to determine service request information for the first service node, the service request information including the requested service type; and a second determining unit 123, configured to determine, based on the service response state information of the first service node mapped on the physical layer, whether the service type that the first service node can provide at the application layer includes the requested service type, and whether the first service node is in an idle service state.

In some embodiments, the second determining unit 123 may include a service type bit information acquisition unit, configured to obtain the service type bit information of the first service node carried by the broadcast channel, where the service type bit information mapped by different service types are different; and a service type detection unit, configured to detect whether the service type that the first service node can provide at the application layer mapped by the service type bit information includes the requested service type. The second determining unit 123 may further include a first service state detection unit, configured to detect the state bit information of the first service node carried by the broadcast channel, and determine whether the first service node is in an idle service state at the application layer, where the state bit information mapped to different service states is different; or, a second service state detection unit, configured to use the reference signal corresponding to the broadcast channel based on the first mapping relationship between different service states and different reference signals to determine whether the first service node is in an idle service state at the application layer; or, a third service state detection unit, configured to use the received synchronization signal corresponding to the first service node based on the second mapping relationship between different service states and different synchronization signals to determine whether the first service node is in an idle service state at the application layer.

In some embodiments, in order to determine the service type bit information and the state bit information of the first service node carried by the broadcast channel, the service request processing device may further include a service response state information acquisition module, configured to obtain the service response state information that can be provided by each of the plurality of service providing nodes within the service management range at the application layer: a service response state information mapping module, configured to map the service response state information to the service type bit and the state bit of the corresponding service providing node carried by the broadcast channel on the physical layer to obtain the corresponding service type bit information and the state bit information: a first mapping relationship acquisition module, configured to map the service state included in the service response state information to the reference signal corresponding to the broadcast channel on the physical layer, and obtain the first mapping relationship between different service states and different reference signals; and a second mapping relationship acquisition module, configured to map the service state included in the service response state information to the synchronization signal of the corresponding type on the physical layer, and obtain the second mapping relationship between different service states and different synchronization signals.

In some embodiments, if the device node described above exists as a service providing node, the service request processing device may further include a state information reporting module, configured to send the current state information of the service providing node in the application layer to the corresponding management node, thereby updating the service state corresponding to the service providing node mapped by the management node on the physical layer: or, a service state listening module, configured to listen to the current service state of the service providing node in the application layer; and a service state reporting module, configured to detect that the current service state has changed relative to the locally stored service state, and send the current service state to the corresponding management node to update the service state corresponding to the service providing node mapped by the management node on the physical layer.

Figure 12:
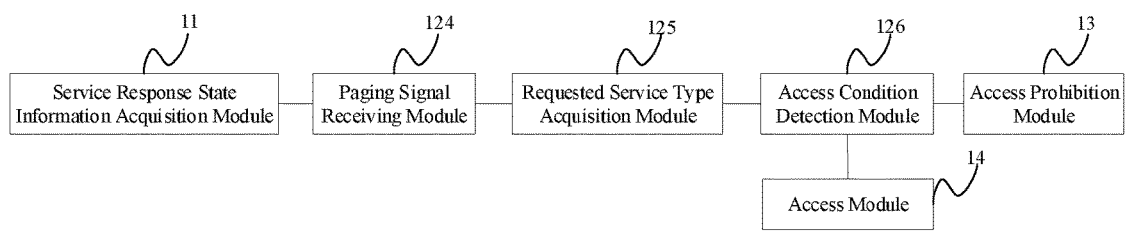
FIG. 12 is a schematic structural diagram of the service request processing device according to an embodiment of the present disclosure.

In some embodiments, if the device node exists as a service providing node, as shown in FIG. 12, the detection module 12 may further include a paging signal receiving module 124, configured to receive the paging signal sent by the management node for the service providing node: a requested service type acquisition module 125, configured to obtain the requested service type for the service providing node mapped on the physical layer by the paging signal; and an access condition detection module 126, configured to determine, based on the service response state information, whether the service type that the service providing node can provide at the application layer includes the requested service type, and whether the service providing node is in an idle service state.

It should be noted that the various modules, units, etc. in the foregoing device embodiments may be stored in a memory as program modules, and a processor may be configured to execute the program modules stored in the memory to realize the corresponding functions. For the functions and technical effects that can be achieved by the program modules and their combinations, reference can be made to the descriptions in the corresponding parts of the foregoing method embodiments, which will not be repeated here.

An embodiment of the present disclosure further provides a computer-readable storage medium having a computer program stored thereon. The computer program can be called and executed by a processor to implement each process of the service request processing method described in the foregoing embodiments. For the specific implementation process, reference can be made to the descriptions in the corresponding parts of the foregoing embodiments, which will not be repeated here.

Figure 13:
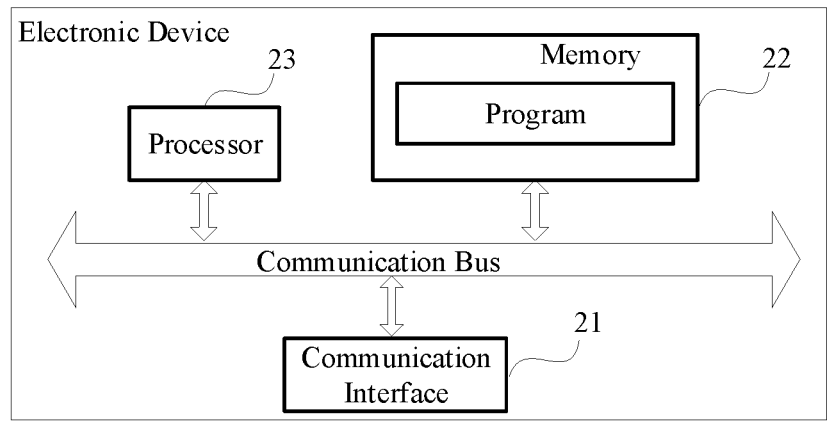
FIG. 13 is a schematic diagram of a hardware structure of an electronic device suitable for the service request processing method and device according to an embodiment of the present disclosure.

FIG. 13 is a schematic diagram of a hardware structure of an electronic device suitable for the service request processing method and device according to an embodiment of the present disclosure. The computer device includes a communication interface 21, a memory 22, and a processor 23. The number of the communication interface 21, the memory 22, and the processor 23 can be at least one, and the communication interface 21, the memory 22, and the processor 23 can all be connected to a communication bus to realize mutual data interaction through the communication bus. The specific implementation process can be determined based on actual needs, which will not be described in detail in the present disclosure.

The communication interface 21 may include a communication module capable of realizing data interaction by using a wireless communication network, such as a data transmission interface of a Wi-Fi module, a 5G/6G (fifth generation mobile communication network/sixth generation mobile communication network) module, a GPRS module, etc. In addition, the communication interface 21 may also include a communication interface for realizing data interaction between the internal components of the computer device, such as a USB interface, a serial/parallel port, etc. The present disclosure does not limit the specific components included in the communication interface 21.

In some embodiments, the memory 22 may include a high-speed random-access memory, but may also include a non-volatile memory, such as at least one magnetic disk storage device or other volatile solid-state device. The processor 23 may be a central processing unit (CPU), an application-specific integrated circuit (ASIC), a digital signal processor (DSP), a field programmable gate array (FPGA), or other programmable logic devices.

In practical applications, the memory 22 may be used to store a program for implementing the service request processing method described in any of the foregoing method embodiments. The processor 23 may be configured to load and execute the program stored in the memory 22 to realize the various processes of the service request processing method described in the foregoing embodiments. For the specific implementation process, reference can be made to the descriptions in the corresponding parts of the foregoing embodiments, which will not be repeated here.

In some embodiments, the electronic device may also include at lest one input device such as a touch sensing unit configured to sense touch events on a touch display panel, a keyboard, a mouse, an image collector (such as a camera), a sound collector, etc.; and at least one output device such as a display screen, a speaker, a vibration mechanism, a lamp, etc.: a power management module; and a sensing module including various sensors. It should be noted that FIG. 14 only shows some of the components of the electronic device, and the present disclosure does not limit the components in the electronic device.

Figure 14:
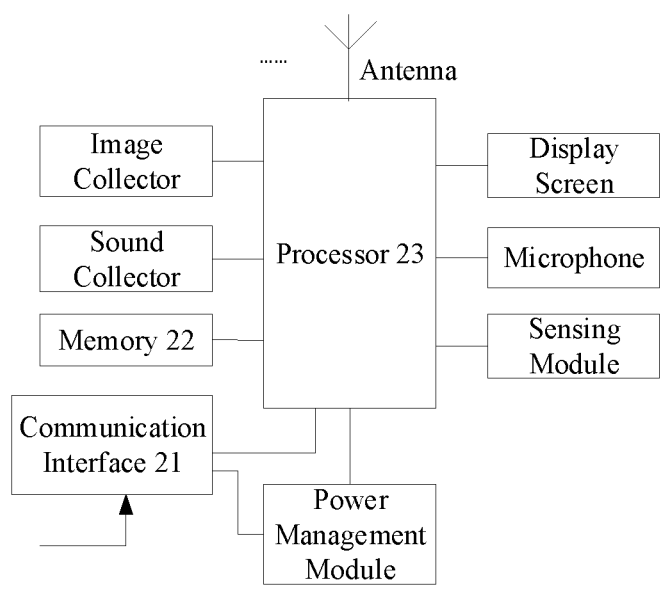
FIG. 14 is a schematic diagram of the hardware structure of the electronic device suitable for the service request processing method and device according to an embodiment of the present disclosure.

It should be understood that the structures of the electronic device shown in FIG. 13 and FIG. 14 do not constitute a limitation on the electronic devices in the embodiments of the present disclosure. In practical applications, the electronic device may include more or less components than those shown in FIG. 13 or FIG. 14, or may combine some components, which will not be described in detail in the present disclosure.

It should be noted that the various embodiments in the present specification are described in a progressive manner, and each embodiment focuses on differences from other embodiments, and the same similar parts between the various embodiments can be referred to each other. Since the device and system disclosed in the embodiments are corresponding to the methods disclosed in the embodiments, the descriptions of the device and system are brief and relevant parts may be made reference to the description of the corresponding method embodiments.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A service request processing method comprising:
receiving, by a service receiving node, a service notification message from a management node;
obtaining, by the service receiving node, first service response state information from the service notification message, the first service response state information of a first service node being mapped by the management node from an application layer of the first service node to a physical layer;
detecting, by the service receiving node, based on the first service response state information about the application layer of the first service node, whether an access condition of the first service node is satisfied;
prohibiting, by the service receiving node, outputting a physical layer access request to the first service node if the access condition is not satisfied; and
outputting, by the service receiving node, the physical layer access request for the first service node to request to establish a physical transmission link with the first service node to receive requested service information fed back by the first service node through the physical transmission link if the access condition is satisfied.

2. The method of claim 1, wherein obtaining the first service response state information of the first service node mapped on the physical layer includes:
receiving the service notification message sent by the management node through broadcasting or multicasting, the service notification message including a plurality of pieces of service response state information of a plurality of service nodes that is mapped to the physical layer, the plurality of service nodes being located within a service management range of the management node; and
determining the first service response state from the service notification message.

3. The method of claim 1, wherein detecting whether the access condition of the first service node is satisfied includes:
determining whether the first service node is in an idle service state or a busy service state at the application layer of the first service node based on the first service response state information.

4. The method of claim 1, wherein detecting whether the access condition of the first service node is satisfied includes:
determining service request information for the first service node, the service request information including a requested service type; and
determining whether a service type that the first service node provides at the application layer includes the requested service type based on the first service response state information, and whether the first service node is in an idle service state based on the first service response state information.

5. The method of claim 1, wherein detecting whether the access condition of the first service node is satisfied includes:
determining whether a service type that the first service node provides at the application layer includes a requested service type, including:
obtaining first service type bit information of the first service node carried by a broadcast channel, wherein service type bit information of a node has one or more bits and indicates a service type that the node provides, and different service types correspond to different service type bit information;
detecting whether the service type that the first service node provides at the application layer includes the requested service type based on the first service type bit information; and
determining whether the first service node is in an idle service state, comprising:
detecting first state bit information of the first service node carried by the broadcast channel to determine whether the first service node is in the idle service state at the application layer, state bit information corresponding to different service states being different; or,
using a reference signal corresponding to the broadcast channel to determine whether the first service node is in the idle service state at the application layer based on a first mapping relationship between different service states and different reference signals; or,
using a received synchronization signal corresponding to the first service node to determine whether the first service node is in the idle service state at the application layer based on a second mapping relationship between different service states and different synchronization signals.

6. The method of claim 1, when the service receiving node serves as a service providing node, further comprising:
sending, by the service providing node, current state information of the service providing node at the application layer to the corresponding management node to update a service state corresponding to the service providing node, the service state of the service providing node being mapped by the management node to the physical layer; or,
monitoring, by the service providing node, a current service state of the service providing node in the application layer; and sending the current service state to the corresponding management node to update a service state corresponding to the service providing node in response to detecting that the current service state has changed relative to a locally stored service state, the service state of the service providing node being mapped by the management node to the physical layer.

7. The method of claim 1, wherein when the first service node serves as a service providing node, detecting whether the access condition of the first service node is satisfied includes:
receiving, by the service receiving node, a paging signal sent by the management node for the service providing node;
obtaining, by the service receiving node, a requested service type for the service providing node based on the paging signal;

determining, by the service receiving node, whether the service type that the service providing node provides at the application layer includes the requested service type and whether the service providing node is in an idle service state based on the first service response state information; and determining whether the access condition of the first service node is satisfied according to the service type that the service providing node provides at the application layer and whether the service providing node is in the idle service state.

8. The method of claim 5, wherein obtaining the first service type bit information and detecting the first state bit information of the first service node carried by the broadcast channel includes:

obtaining, by the management node, a plurality of pieces of service response state information about service types that a plurality of service providing nodes within a service management range provide at the application layer; and mapping, by the management node, each piece of the service response state information to one or more service type bits and a state bit of the corresponding service providing node carried by the broadcast channel on the physical layer.

9. The method of claim 5, wherein the first mapping relationship is obtained by:

mapping, by the management node, the different service states to the different reference signals corresponding to the broadcast channel on the physical layer.

10. The method of claim 5, wherein the second mapping relationship is obtained by:

mapping, by the management node, the different service states to the different synchronization signals of corresponding types on the physical layer.

11. An electronic device of a service receiving node, comprising:

a communication interface;
a processor; and
a memory storing program instructions that, when being executed by the processor, cause the processor to:
receive a service notification message from a management node;
obtain service response state information from the service notification message, the first service response state information of a first service node being mapped by the management node from an application layer of the first service node to a physical layer;
detect, based on the first service response state information about the application layer of the first service node, whether an access condition of the first service node is satisfied;
prohibit outputting a physical layer access request to the first service node if the access condition is not satisfied; and
output the physical layer access request for the first service node to request to establish a physical transmission link with the first service node to receive requested service information fed back by the first service node through the physical transmission link if the access condition is satisfied.

12. The electronic device of claim 11, wherein the program instructions further cause the processor to:

receive the service notification message sent by the management node through broadcasting or multicasting, the service notification message including a plurality of pieces of service response state information of a plurality of service nodes that is mapped to the physical layer, the plurality of service nodes being a plurality of service nodes located within a service management range of the management node; and determine the first service response state information from the service notification message.

13. The electronic device of claim 11, wherein the program instructions further cause the processor to:

determine whether the first service node is in an idle service state or a busy service state at the application layer of the first service node based on the first service response state information.

14. The electronic device of claim 11, wherein the program instructions further cause the processor to:

determine service request information for the first service node, the service request information including a requested service type; and determine whether a service type that the first service node provides at the application layer includes the requested service type based on the first service response state information, and whether the first service node is in an idle service state based on the first service response state information.

15. The electronic device of claim 11, wherein the program instructions further cause the processor to:

obtain first service type bit information of the first service node carried by a broadcast channel, wherein service type bit information of a node has one or more bits and indicates a service type that the node provides, and different service types correspond to different service type bit information;

detect whether a service type that the first service node provides at the application layer includes a requested service type based on the first service type bit information; and detect first state bit information of the first service node carried by the broadcast channel to determine whether the first service node is in an idle service state at the application layer, state bit information corresponding to different service states being different; or, use a reference signal corresponding to the broadcast channel to determine whether the first service node is in the idle service state at the application layer based on a first mapping relationship between different service states and different reference signals; or, use a received synchronization signal corresponding to the first service node to determine whether the first service node is in the idle service state at the application layer based on a second mapping relationship between different service states and different synchronization signals.

16. The electronic device of claim 11, when the service receiving node serves as a service providing node, the program instructions further cause the processor to:

send current state information of the service providing node at the application layer to a corresponding management node to update a service state corresponding to the service providing node, the service state of the service providing node being mapped by the management node to the physical layer; or, listen to a current service state of the service providing node in the application layer; and send the current service state to the corresponding management node to update a service state corresponding to the service providing node in response to detecting that the current service state has changed relative to a locally stored service state, the service state of the service providing node being mapped by the management node to the physical layer.

17. The electronic device of claim 11, wherein when the first service node serves as a service providing node, the program instructions further cause the processor to:
   receive a paging signal sent by the management node for the service providing node;
   obtain a requested service type for the service providing node based on the paging signal;
   determine whether the service type that the service providing node provides at the application layer includes the requested service type and whether the service providing node is in the idle service state based on the first service response state information; and
   detect whether the access condition of the first service node is satisfied according to the service type that the service providing node provides at the application layer and whether the service providing node is in the idle service state.

18. The electronic device of claim 15, wherein obtaining the first service type bit information and detecting the first state bit information of the first service node carried by the broadcast channel includes:
   obtaining, by the management node, a plurality of pieces of service response state information about service types that a plurality of service providing nodes within a service management range provide at the application layer; and
   mapping, by the management node, each piece of the service response state information to one or more service type bits and a state bit of the corresponding service providing node carried by the broadcast channel on the physical layer.

19. The electronic device of claim 15, wherein the first mapping relationship is obtained by:
   mapping, by the management node, the different service states to the different reference signals corresponding to the broadcast channel on the physical layer.

* * * * *